(12) United States Patent
Leith et al.

(10) Patent No.: US 11,812,831 B1
(45) Date of Patent: Nov. 14, 2023

(54) FABRIC COVERS FOR ELECTRONIC DEVICES

(71) Applicant: Apple Inc., Cupertino, CA (US)

(72) Inventors: William Leith, San Francisco, CA (US); Travis C. Pedley, Scotts Valley, CA (US); Mark W. Townsend, San Jose, CA (US); Camille I. Henrot, San Francisco, CA (US); Austin S. Glover, Birmingham, MI (US)

(73) Assignee: Apple Inc., Cupertino, CA (US)

( * ) Notice: Subject to any disclaimer, the term of this patent is extended or adjusted under 35 U.S.C. 154(b) by 346 days.

(21) Appl. No.: 17/368,664

(22) Filed: Jul. 6, 2021

Related U.S. Application Data

(60) Provisional application No. 63/054,562, filed on Jul. 21, 2020.

(51) Int. Cl.
  *A45C 11/00* (2006.01)
  *B32B 5/02* (2006.01)
  *B32B 5/26* (2006.01)
  *B32B 7/09* (2019.01)

(52) U.S. Cl.
  CPC .............. *A45C 11/00* (2013.01); *B32B 5/024* (2013.01); *B32B 5/026* (2013.01); *B32B 5/2795* (2021.05); *B32B 7/09* (2019.01); *A45C 2011/001* (2013.01); *A45C 2011/002* (2013.01); *A45C 2011/003* (2013.01)

(58) Field of Classification Search
  CPC .............. A45C 11/00; A45C 2011/003; A45C 2011/002; A45C 2200/15; D03D 1/0088; D03D 15/00; H04B 1/3888
  See application file for complete search history.

(56) References Cited

U.S. PATENT DOCUMENTS

| | | | |
|---|---|---|---|
| 8,887,903 B2 | 11/2014 | Diebel et al. | |
| 8,960,421 B1 | 2/2015 | Diebel | |
| 9,496,102 B2 | 11/2016 | Bates et al. | |
| 9,545,139 B2* | 1/2017 | Kim | A45C 11/00 |
| 9,675,147 B1 | 6/2017 | Diebel et al. | |
| 9,715,254 B2 | 7/2017 | Mori et al. | |
| 10,439,667 B1* | 10/2019 | Lu | H05K 5/0217 |
| 10,995,433 B1* | 5/2021 | Bergeron | D04B 1/12 |
| 2016/0289872 A1* | 10/2016 | Kieren | D04B 21/20 |
| 2018/0272644 A1* | 9/2018 | Hamada | B32B 7/03 |

* cited by examiner

*Primary Examiner* — Corey N Skurdal
(74) *Attorney, Agent, or Firm* — Treyz Law Group, P.C.; Kendall P. Woodruff

(57) ABSTRACT

A cover for an electronic device may be formed from fabric. The cover may include a front cover portion and a rear cover portion that rotate relative to one another about a first bend axis. The front cover portion may have first and second panels that rotate relative to one another about a second bend axis. The cover may have flexible hinge regions along the first and second bend axes. The flexible hinge regions may include spacer fabric having first and second warp knit fabric layers and spacer strands coupled between the first and second warp knit fabric layers. Stiffeners may be used to stiffen portions of the cover between the flexible hinge regions. An inlay strand may be located in the flexible hinge region in the front cover portion to restrict the range of motion of the first panel relative to the second panel.

20 Claims, 10 Drawing Sheets

US 11,812,831 B1

FABRIC COVERS FOR ELECTRONIC DEVICES

This application claims the benefit of U.S. provisional patent application No. 63/054,562, filed Jul. 21, 2020, which is hereby incorporated by reference herein in its entirety.

FIELD

This relates generally to electronic devices, and, more particularly, to fabric covers for electronic devices.

BACKGROUND

Electronic devices such as tablet computers include displays. A cover may be used to help protect a display in a tablet computer from damage.

Plastic covers may be satisfactory in certain situations, but some users may desire a cover with different aesthetics. As a result, fabric covers have been developed.

There are challenges associated with forming fabric covers for electronic devices. If care is not taken, fabric covers may not wear well, may be bulky, or may have an undesirable appearance.

SUMMARY

A cover for a portable electronic device may be formed from fabric. The cover may include a front cover portion and a rear cover portion. First and second warp knit fabric layers may span across the front and rear cover portions.

The cover may be configured to fold along one or more bend axes. For example, the front cover portion may be configured to rotate relative to the rear cover portion about a first bend axis. The front cover portion may have first and second panels configured to rotate relative to one another about a second bend axis.

The cover may have flexible hinge regions along the first and second bend axes. The flexible hinge regions may include spacer fabric having spacer strands coupled between the first and second warp knit fabric layers.

The cover may include panel regions on either side of the flexible hinge regions. To provide the panel regions with more rigidity, stiffeners may be incorporated into the panel regions in place of the spacer strands. For example, stiffeners may be located between the first and second warp knit fabric layers to stiffen the panels between the flexible hinge regions. In other arrangements, spacer strands with a lower melting temperature may be used in the panel regions and may be melted by applying heat to increase the rigidity of the panel regions.

An inlay strand may be located in the flexible hinge region in the front cover portion to restrict the range of motion of the first panel relative to the second panel. Inlay strands may be inserted across (e.g., laid in) a warp knit fabric layer in hinge region. The restricted motion of the first panel relative to the second panel may allow the cover to serve as a stand for the electronic device.

DETAILED DESCRIPTION

Figure 1:
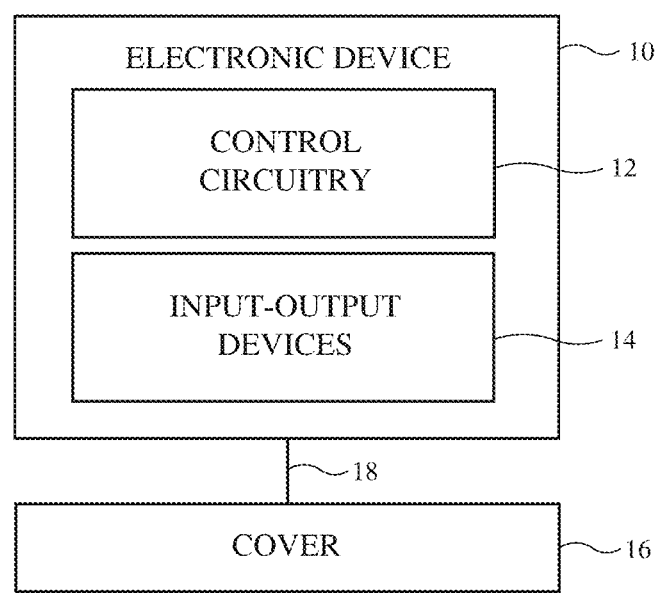
FIG. 1 is a schematic diagram of an illustrative electronic device and associated cover in accordance with an embodiment.

Electronic devices may be provided with protective covers (sometimes referred to as cases or enclosures). A schematic diagram of an illustrative electronic device 10 and associated cover 16 is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a case, bag, watch band, or other accessory that operates in conjunction with one of these devices or other equipment, equipment that implements the functionality of two or more of these devices, or other electronic equipment. As an example, device 10 may be a portable electronic device such as a tablet computer, cellular telephone, or media player, and cover 16 may be an accessory such as a removable cover (sometimes referred to as a folio, case, or enclosure). Other configurations may be used for device 10 and cover 16 if desired. The example of FIG. 1 is merely illustrative.

Electronic device 10 may have control circuitry 12. Control circuitry 12 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 14 may be used to allow data to be supplied to device 10 and to allow data to be provided from device 10 to external devices. Input-output devices 14 may include a display, buttons, joysticks, scrolling wheels, touch pads, key pads, keyboards, audio components such as microphones and speakers, tone generators, vibrators, cameras, sensors, light-emitting diodes and other status indicators, data ports, etc. Wireless circuitry in devices 14 may be used to transmit and receive radio-frequency wireless signals. Wireless circuitry may include antennas and radio-frequency transmitters and receivers operating in wireless local area network bands, cellular telephone bands, and other wireless communications bands.

A user can control the operation of device 10 by supplying commands through input-output devices 14 and may receive status information and other output from device 10 using the output resources of input-output devices 14. Control circuitry 12 may be used to run software on device 10 such as operating system code and applications. During operation of device 10, the software running on control circuitry 12 may use input-output devices 14 to gather user input and other input and can provide the user with visual output, audio output, and other output.

Cover 16 may not include any circuitry, may include the same circuitry as device 10, or may include additional and/or different circuitry than device 10. For example, cover 16 may include a keyboard for gathering user keystroke input that is communicated to device 10 over a wired or wireless communications path. In arrangements where cover 16 includes circuitry, cover 16 and device 10 may communicate via path 18 (e.g., a wired or wireless communications path). Path 18 may be used to share input and output information between device 10 and cover 16. If desired, portions of path 18 may be included in device 10 and/or cover 16. Arrangements in which cover 16 does not include circuitry are sometimes described herein as an illustrative example.

When it is desired to protect device 10 with cover 16, device 10 may be press fit into cover 16, may be coupled to cover 16 using magnets, clips, or straps, or other structures, and/or may otherwise be inserted into or covered with cover 16. Cover 16 may, if desired, have a credit card pocket or other pocket. Cover 16 may be formed from fabric, leather, polymer, other materials, and/or combinations of these materials.

Cover 16 may, for example, include one or more flexible fabric layers. These fabric layers may accommodate bends (e.g., tight bends) in cover 16, which may in turn enhance cover aesthetics by allowing cover 16 to be a thin and flexible outer layer on device 10.

Figure 2:
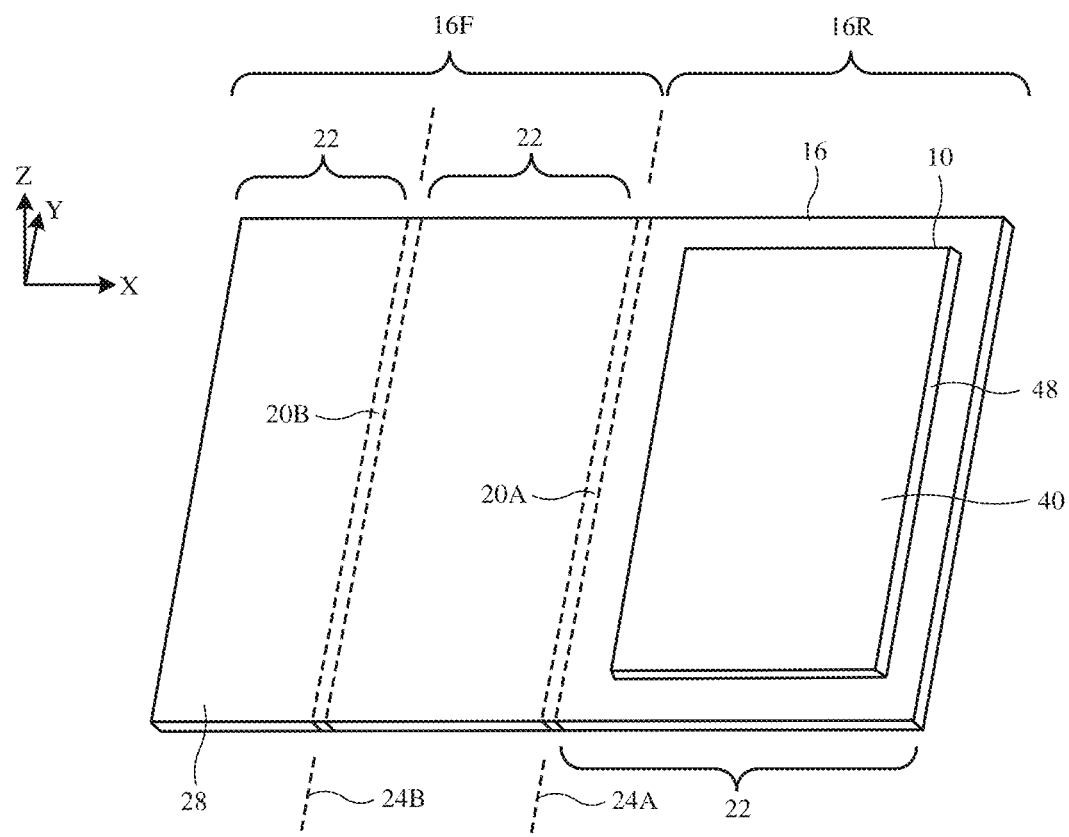
FIG. 2 is a perspective view of an illustrative electronic device and associated cover in accordance with an embodiment.

A perspective view of an illustrative electronic device and associated protective cover is shown in FIG. 2. Cover 16 may have any suitable shape that allows cover 16 to mate with electronic device 10. In the example of FIG. 1, cover 16 has a folio shape (sometimes referred to as a folio cover) with a rear portion 16R and front portion 16F. Rear portion 16R may be planar (as shown in the example of FIG. 2) or may have a rectangular recess surrounded by peripheral sidewalls or other suitable structures (straps, clips, a sleeve, corner pockets, etc.) that allow cover 16 to receive and couple to device 10.

In the illustrative configuration of FIG. 2, device 10 is a portable device such as a cellular telephone or tablet computer having a display such as display 40 mounted in a housing such as housing 48.

Housing 48, which may sometimes be referred to as an enclosure or case, may be formed of plastic, glass, ceramics, fiber composites, fabric, metal (e.g., stainless steel, aluminum, etc.), other suitable materials, or a combination of any two or more of these materials. Housing 48 may be formed using a unibody configuration in which some or all of housing 48 is machined or molded as a single structure or may be formed using multiple structures (e.g., an internal frame structure, one or more structures that form exterior housing surfaces, etc.).

Display 40 may be a touch screen display that incorporates a layer of conductive capacitive touch sensor electrodes. Capacitive touch screen electrodes may extend across the surface of display 40 to gather touch input from a user's fingers or other external objects. Capacitive touch screen electrodes may be formed from an array of indium tin oxide pads, overlapping horizontal and vertical strips of indium tin oxide, indium tin oxide or other conductive material patterned in diamond shapes, or other transparent conductive structures (as examples). In some arrangements, thin-film metal traces on a display substrate may be used in forming touch sensor electrodes.

Display 40 may include an array of pixels. The array of pixels in display 40 may form an active area such as a rectangular active area. Device 10 may have opposing front and rear faces. Display 40 may be formed on the front face of device 10 and may be used in displaying images for a user. Display 40 may be a liquid crystal display, an organic light-emitting diode display, or other suitable display. Display 40 may be protected using a display cover layer such as a layer of transparent glass or clear plastic. Openings may be formed in the display cover layer. For example, an opening may be formed in the display cover layer to accommodate a button, a speaker port, or other component. If desired, openings may be formed in housing 48 to form communications ports (e.g., an audio jack port, a digital data port, etc.), to form openings for buttons, etc.

Cover 16 may include fabric such as fabric 28. Fabric 28 may form all or part of cover 16. Fabric 28 may be soft (e.g., cover 16 may have a fabric surface that yields to a light touch), may have a rigid feel (e.g., the surface of cover 16 may be formed from a stiff fabric), may be coarse, may be smooth, may have ribs or other patterned textures, and/or may be formed as part of a cover that has portions formed from non-fabric structures of plastic, leather, metal, glass, crystalline materials, ceramics, or other materials.

Fabric 28 may include intertwined strands of material. Fabric 28 may, for example, include one or more warp knit fabric layers that are formed by warp knitting strands of material. Strands in fabric 28 may be single-filament strands (sometimes referred to as fibers or monofilaments) or may be strands of material formed by intertwining multiple monofilaments of material together (sometimes referred to as yarns).

Strands in fabric 28 may be formed from polymer, metal, glass, graphite, ceramic, natural materials such as cotton or bamboo, or other organic and/or inorganic materials and combinations of these materials. Conductive coatings such as metal coatings may be formed on non-conductive material. For example, plastic strands in fabric 28 may be coated with metal to make them conductive. Reflective coatings such as metal coatings may be applied to make strands reflective. Strands may be formed from bare metal wires or metal wire intertwined with insulating monofilaments (as examples). Bare metal strands and strands of polymer covered with conductive coatings may be provided with insulating polymer jackets.

Cover 16 may contain foldable sections (horizontal strips) such as sections 22. Sections 22 (sometimes referred to as panels) may bend about one or more bend axes such as bend axes 20A and 20B. To accommodate bending of cover 16 about bend axes such as bend axes 24A and 24B, cover 16 may be provided with flexible hinge portions along the boundaries between sections 22. For example, cover 16 may have a first flexible hinge portion 20A along fold axis 24A and may have a second flexible hinge portion 20B along fold axis 24B. Flexible hinge portion 20A may be located along a spine of cover 16 and may allow front portion 16F to rotate with respect to rear portion 16R (e.g., so that front portion 16F can fold on top of rear portion 16R, can fold behind rear portion 16R, and/or can lay flat and coplanar with rear portion 16R). Flexible hinge portion 20B may be interposed between first and second sections 22 of front cover portion 16F. Flexible hinge portion 20B may allow front cover portion 16F to serve as a stand for propping up device 10 (e.g., so that a user can view content on display 40 without having to hold device 10 in an upright configuration).

If desired, cover 16 may be configured to bend along more than two axes. For example, front cover portion 16F may have an additional hinge region that allows front cover portion 16F to fold along an additional bend axis parallel to axis 24B. The use of two bend axes in front cover portion 16F may allow for two different stand configurations (e.g., so that device 10 can be propped up at two different angles relative to the surface on which device 10 is resting). Arrangements in which cover 16 has a spine hinge 20A and a front cover hinge 20B are sometimes described herein as an illustrative example.

Flexible hinges in cover 16 such as flexible hinges 20A and 20B may include spacer fabric. For example, fabric 28 may be a multi-layer fabric having inner and outer warp knit layers that are joined by a spacer layer (e.g., one or more monofilaments or other spacer strands that are coupled between the inner and outer warp knit layers of fabric 28). Incorporating spacer fabric into hinge regions such as hinges 20A and 20B allows cover 16 to be sufficiently flexible at the hinge regions while also providing fabric 28 with a soft cushioning feel. If desired, the spacer layer (e.g., the spacer strands) may be located only in flexible hinge regions such as regions 20A and regions 20B, while panel regions 22 between hinges 20A and 20B may be free of a spacer layer and may instead include stiffening structures between inner and outer layers of fabric 28. This is merely illustrative, however. If desired, a spacer layer may be incorporated throughout cover 16.

Figure 3:
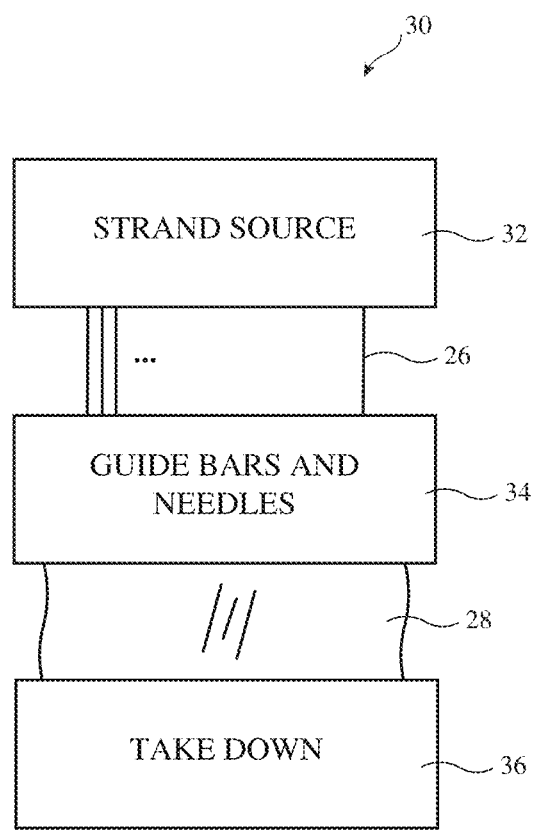
FIG. 3 is a schematic diagram of an illustrative knitting system in accordance with an embodiment.

A warp knitting machine or other equipment may be used in forming fabric 28 of cover 16. FIG. 3 is a schematic diagram of an illustrative warp knitting system. As shown in FIG. 3, strand source 32 in warp knitting system 30 may be used in supplying strands 26 to guide and needle structures 34. Structures 34 may include strand guide structures (e.g., a system of movable guide bars with eyelets that guide strands 26) and needle systems (e.g., needles and needle guide systems that guide sets of individually adjustable needles so that the needles may interact with the strands dispensed by the guide bars). During operations, a controller may control electrically adjustable positioners in system 30 to manipulate the positions of guide bars and needles in system 30 and thereby knit strands 26 into fabric 28. Take down 36 (e.g., a pair of mating rollers or other equipment forming a take down system) may be used to gather fabric 28 that is produced during knitting.

Figure 4:
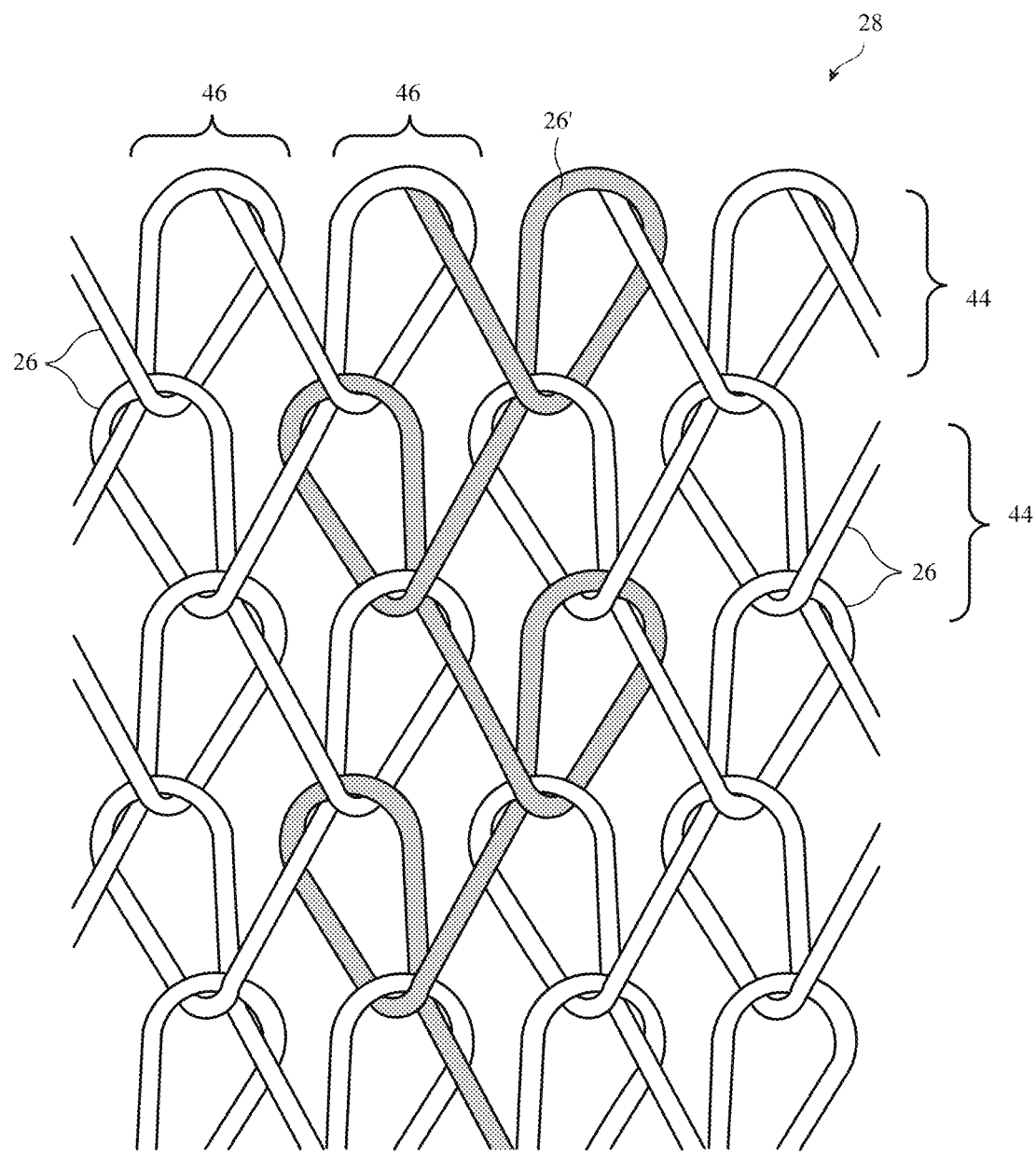
FIG. 4 is a diagram of a portion of an illustrative layer of warp knit fabric in accordance with an embodiment.

A layer of illustrative warp knit fabric 28 is shown in FIG. 4. An illustrative strand 26' among strands 26 has been highlighted to show the zig-zag path taken by strands 26 in fabric 28. Knit fabrics may be made up of courses and wales. A course such as course 44 is a row of loops produced by adjacent needles during the same knitting cycle. A wale such as wale 46 is a column of loops produced by the same needle during successive knitting cycles.

During knitting, control circuitry in system 30 may direct electrically adjustable positioners in system 30 to knit fabric 28 with any suitable warp knit pattern. As an example, control circuitry in system 30 may use the electrically adjustable positioners to knit fabric 28 that includes diamond-shaped openings or openings of other suitable shapes. System 30 may also be used to knit fabric 28 that a first set of characteristics in stiffer portions of cover 16 (e.g., panels 22) and a second set of characteristics in the more flexible portions of cover 16 (e.g., hinge regions 20A and 20B). For example, hinge regions 20A and 20B may have a spacer layer to provide a flexible cushion between inner and outer fabric layers, whereas panels 22 may be free of a spacer layer and may instead include a stiffening structure between inner and outer fabric layers.

Figure 5:
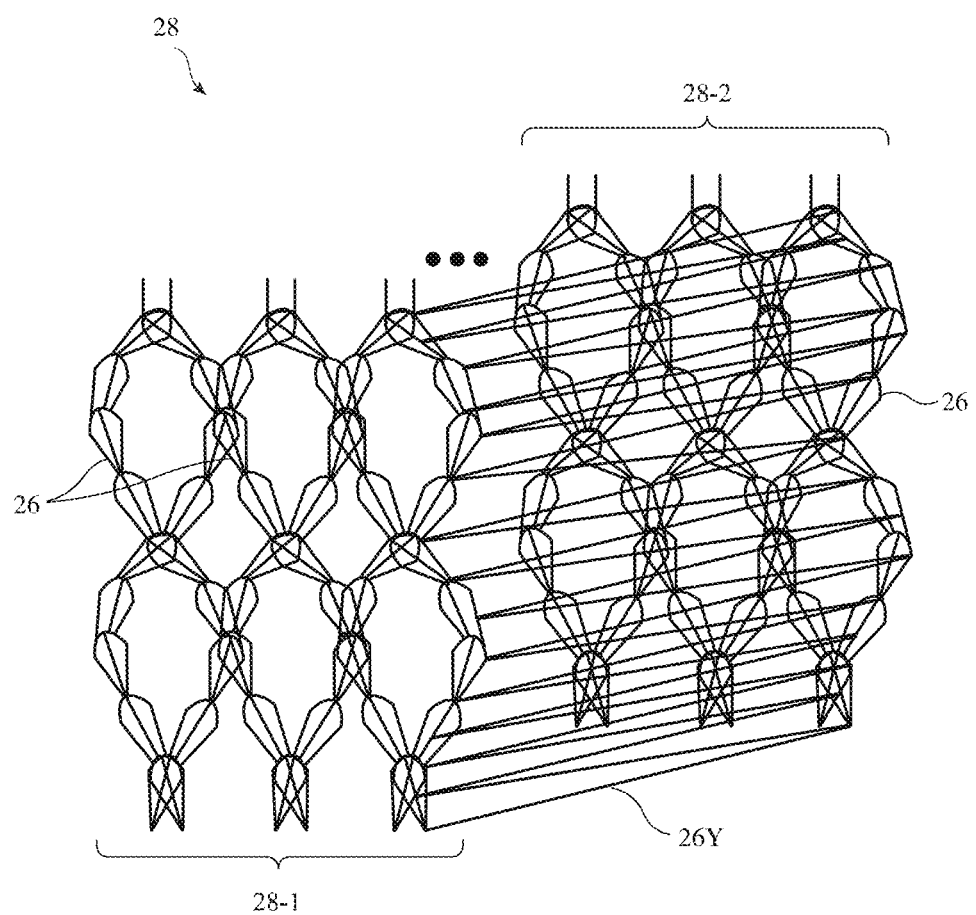
FIG. 5 is a perspective view of an illustrative spacer fabric in accordance with an embodiment.

FIG. 5 is a perspective view of a portion of fabric 28 that includes spacer fabric. As shown in FIG. 5, fabric 28 may include first and second fabric layers such as first fabric layer 28-1 and second fabric layer 28-2. First fabric layer 28-1 may be formed using a first set of needles 34 (sometimes referred to as a needle bed) in system 30 of FIG. 3, and second fabric layer 28-2 may be formed using a second set of needles 34 in system 30 of FIG. 3.

Fabric layers 28-1 and 28-2 may be joined by spacer layer formed from spacer strands 26Y. Spacer strands 26Y may be formed from monofilaments (e.g., polymer monofilament fibers) and/or other strands of material. Each spacer strand 26Y of the spacer layer between fabric layers 28-1 and 28-2 may be coupled alternately to inner fabric layer 28-1 and outer fabric layer 28-2. If desired, spacer strands 26Y may also form some of the loops in one or both of warp knit fabric layers 28-1 and 28-2.

Figure 6:
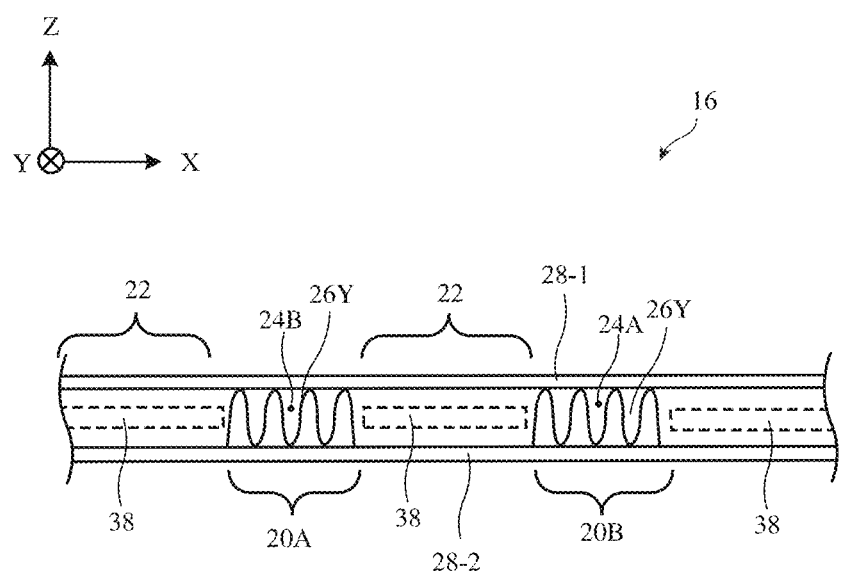
FIG. 6 is a cross-sectional side view of an illustrative cover having warp knit outer layers, hinge regions with spacer strands, and stiffeners between hinge regions in accordance with an embodiment.

FIG. 6 is a cross-sectional side view of an illustrative cover that incorporates spacer fabric of the type shown in FIG. 5. As shown in FIG. 6, cover 16 may include panel regions 22 that can rotate relative to one another about one or more axes. For example, panels 22 on opposing sides of hinge region 20A (e.g., a spine hinge) may be configured to rotate relative to one another about hinge axis 24A. Panels 22 on opposing sides of hinge region 20B (e.g., a front cover hinge) may be configured to rotate relative to one another about hinge axis 24B. Hinge axes 24A and 24B may both be parallel to the y-axis of FIG. 6.

Cover 16 may be formed partially or entirely from fabric 28. In the illustrative configuration of FIG. 6, cover 16 includes first fabric layer 28-1 and second fabric layer 28-2. Fabric layers 28-1 and 28-2 may be warp knit fabric layers of the type shown in FIGS. 4 and 5, for example. This is merely illustrative, however. If desired, fabric layers 28-1 and 28-2 may be woven fabric layers, knit fabric layers, braided fabric layers, and/or fabric layers with any other suitable type of fabric construction. Arrangements in which fabric layers 28-1 and 28-2 are warp knit fabric layers are sometimes described herein as an illustrative example. The wales of each fabric layer 28-1 and 28-2 (e.g., wales 46 of FIG. 4) may extend along the y-axis of FIG. 6, while the courses of each fabric layer 28-1 and 28-2 (e.g., courses 44 of FIG. 4) may extend along the x-axis of FIG. 6. This is merely illustrative, however. If desired, the wales of each fabric layer 28-1 and 28-2 (e.g., wales 46 of FIG. 4) may extend along the x-axis of FIG. 6, while the courses of each fabric layer 28-1 and 28-2 (e.g., courses 44 of FIG. 4) may extend along the y-axis of FIG. 6.

The example of FIG. 6 in which fabric layers 28-1 and 28-2 span across panel regions 22 and hinge regions 20A and 20B is merely illustrative. If desired, fabric layers 28-1 and 28-2 may be present in flexible hinge regions 20A and 20B, while panel regions 22 may be formed using non-fabric materials (e.g., polyurethane, leather, and/or any other suitable material may span across panels 22). For example, layers 28-1 and 28-2 in regions 22 may be replaced by leather, polyurethane, or other suitable material that is glued, stitched, or otherwise attached to layers 28-1 and 28-2 in hinge regions 20A and 20B. Arrangements in which fabric layers 28-1 and 28-2 span across the entirety of cover 16 are sometimes described herein as an illustrative example.

To provide cover 16 with flexibility in hinge regions 20A and 20B and stiffness in panel regions 22, cover 16 may incorporate different materials and/or different structures between fabric layers 28-1 and 28-2. In hinge regions such as regions 20A and 20B, cover 16 may include a spacer layer such as spacer strands 26Y in hinge regions 20A and 20B. As shown in FIG. 6 (and FIG. 5), spacer strands 26Y may be coupled to fabric layers 28-1 and 28-2 and may form a soft, flexible cushion layer in hinge regions 20A and 20B that allows panels 22 to rotate relative to one another about axes 24A and 24B.

To make panels 22 more rigid than hinge regions 20A and 20B, panels 22 may include a stiffening material between fabric layers 28-1 and 28-2. In the example of FIG. 6, panels 22 of cover 16 may include stiffeners such as stiffeners 38 between fabric layers 28-1 and 28-2. Stiffeners 38 may be stiff rectangular panels of material such as fiberglass, polymer (e.g., polyethylene terephthalate or other thermoplastic polymer), or other suitable material. Stiffeners 38 may be fixed to one or both of fabric layers 28-1 and 28-2 (e.g., using adhesive, thermoplastic material, stitching, and/or other suitable attachment structure), or stiffeners 38 may be free to move relative to fabric layers 28-1 and 28-2. The absence of a spacer layer between fabric layers 28-1 and 28-2 may allow a stiffer material to be placed between fabric layers 28-1 and 28-2 to thereby create rigid panel regions 22.

Figure 7:
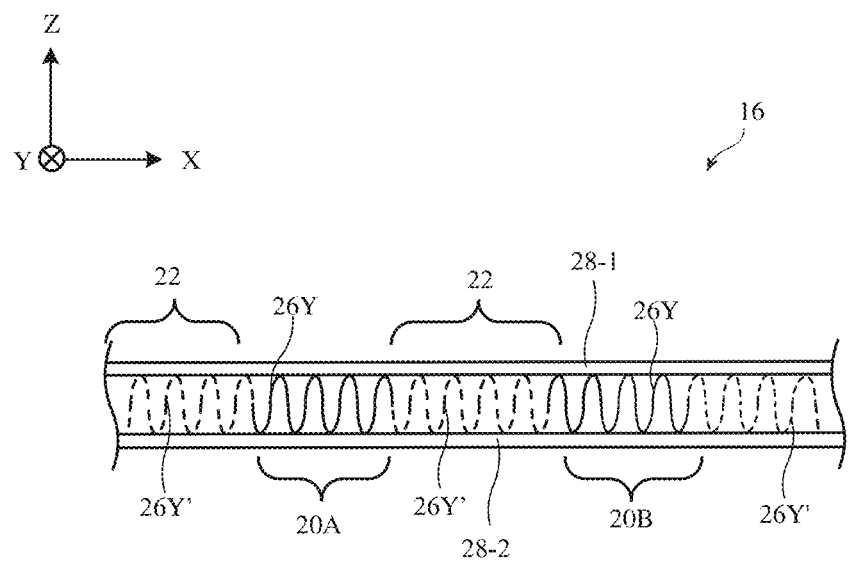
FIG. 7 is a cross-sectional side view of an illustrative cover having warp knit outer layers, hinge regions with spacer strands, and stiffened spacer strands between hinge regions in accordance with an embodiment.

The example of FIG. 6 in which rigid panel regions 22 are free of a spacer layer is merely illustrative. If desired, rigid panel regions 22 may include a spacer layer that is more rigid than the spacer layer in hinge regions 20A and 20B. This type of arrangement is illustrated in FIG. 7. As shown in FIG. 7, both rigid panel regions 22 and flexible hinge regions 20A and 20B include a spacer layer between fabric layers 28-1 and 28-2. In hinge regions 20A and 20B, cover 16 may include spacer strands 26Y coupled between fabric layers 28-1 and 28-2. In panel regions 22, cover 16 may include spacer strands 26Y' coupled between fabric layers 28-1 and 28-2. To provide panel regions 22 with more rigidity, spacer strands 26Y' in panel regions 22 may have a different melting temperature than spacer strands 26Y in hinge regions 20A and 20B. For example, spacer strands 26Y' may be formed from fusible material (e.g., polyester, polypropylene, etc.) having a lower melting temperature than spacer strands 26Y. If desired, heat may be applied to panel regions 22 to melt strands 26Y' and thereby create regions with a higher modulus of elasticity than hinge regions 20A and 20B.

Figure 8:
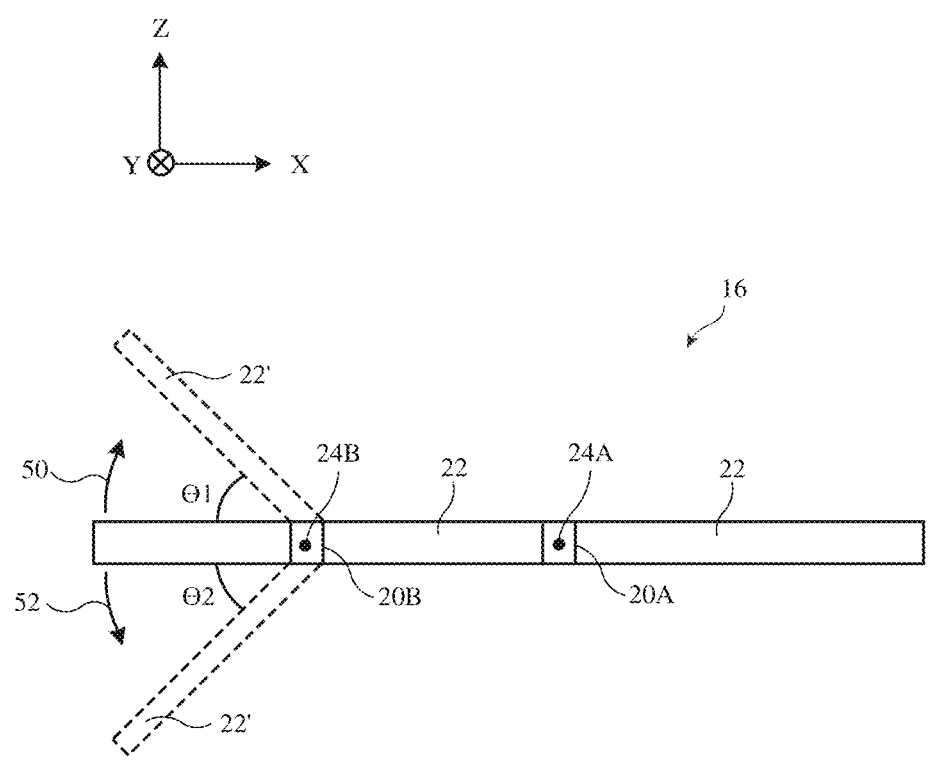
FIG. 8 is a cross-sectional side view of an illustrative cover having a hinge region with a restricted range of motion in accordance with an embodiment.

In some arrangements, it may be desirable to restrict the range of motion of one or more portions of cover 16. As shown in FIG. 8, for example, it may be desirable to restrict the range of motion of panel region 22' so that it locks out (e.g., transitions from elastic behavior to inelastic behavior) at a desired angle so that cover 16 can act as a stand for device 10. Panel 22' may be configured to rotate in direction 50 about axis 24B and/or panel 22' may be configured to rotate in direction 52 about axis 24B. One or both directions of rotation of panel 22' may be restricted. For example, panel 22' may be prevented from moving beyond angle θ1 when rotated in direction 50 and/or may be prevented from moving beyond angle θ2 when rotated in direction 52. Angles θ1 and θ2 may be the same or different. For example, angles θ1 and θ2 (e.g., measured relative to the position of panel 22' in a flat state where panel 22' is coplanar with adjacent panel 22, as shown in FIG. 8) may be 60 degrees, 45 degrees, 30 degrees, 90 degrees, more than 60 degrees, less than 60 degrees, or any other suitable angle.

Figure 9:
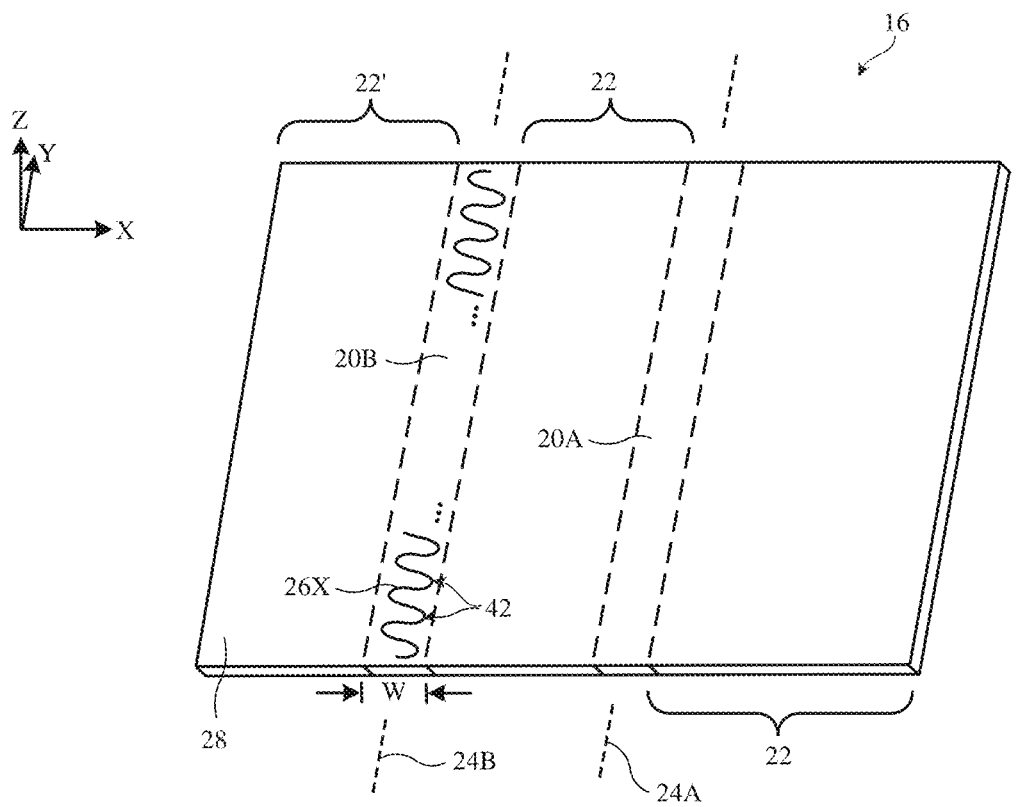
FIG. 9 is a perspective view of an illustrative cover having an inlay strand that restricts a range of motion of at least part of the cover in accordance with an embodiment.

To restrict rotation of panel 22' along one or both of directions 50 and 52, fabric 28 may incorporate one or more inlay strands, as shown in FIG. 9. Inlay strands such as inlay strand 26X may be inserted into fabric 28 along hinge region 20B. Inlay strands 26X that are laid in parallel to the courses of fabric 28 (e.g., courses 44 of FIG. 4) may sometimes be referred to as weft insertion strands. Inlay strands 26X that are laid in parallel to the wales of fabric 28 (e.g., wales 46 of FIG. 4) may sometimes be referred to as warp insertion strands. Inlay strand 26X of FIG. 9 may be a warp insertion strand or weft insertion strand depending on the direction of the courses and wales of fabric 28. Inlay strands 26X may be formed from the same or different material as the other strands in fabric 28 (e.g., strands 26 in layers 28-1 and 28-2, spacer strand 26Y, etc.). Inlay strand may be incorporated into one or both of warp knit layers 28-1 and 28-2 of fabric 28 in hinge region 20B.

In contrast to woven fabrics in which weft strands have a wave-like shape due to the over-under weaving pattern, inlay strands such as strands 26X are able to lie flat in fabric 28 because the strands are inserted into fabric 28 between rows (or columns) of stitching. This allows strands 26X to control the range of motion of panel 22' about axis 24B by limiting how much fabric 28 can stretch in hinge region 20B.

The amount by which inlay strand 26X limits the range of motion of panel 22' about axis 24B can be adjusted by adjusting the tension in inlay strand 26X. The tension of inlay strand 26X may be adjusted by adjusting the width W that inlay yarn 26X spans across in hinge region 20B, by adjusting the path of inlay yarn 26X (e.g., whether inlay yarn 26X snakes back and forth every row or column of loops, every other row or column of loops, etc.), and/or by modifying edges 42 of inlay yarn 26X (e.g., by cutting edges 42, fusing edges 42 to another part of fabric 28, and/or by attaching edges 42 to another part of fabric 28 using adhesive, stitching, thermoplastic material, etc.).

Figure 10:
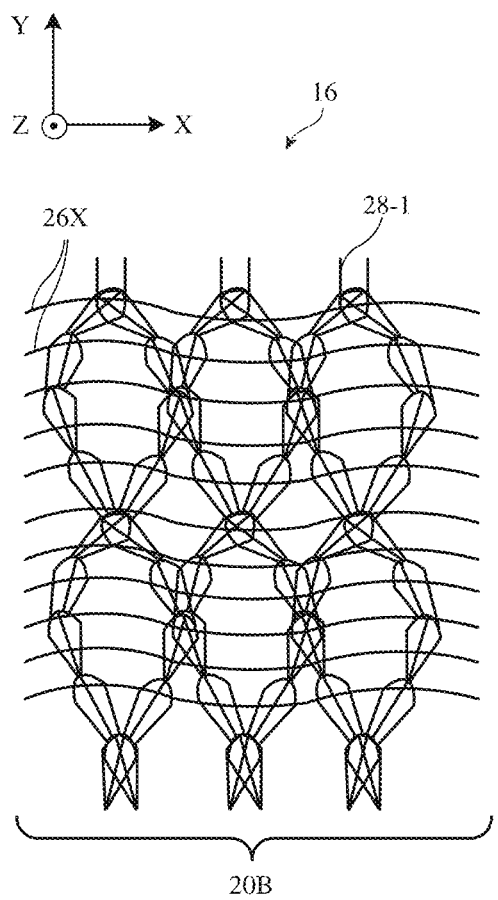
FIG. 10 is a diagram of a portion of an illustrative cover having a hinge region in a flat state in accordance with an embodiment.
Figure 11:
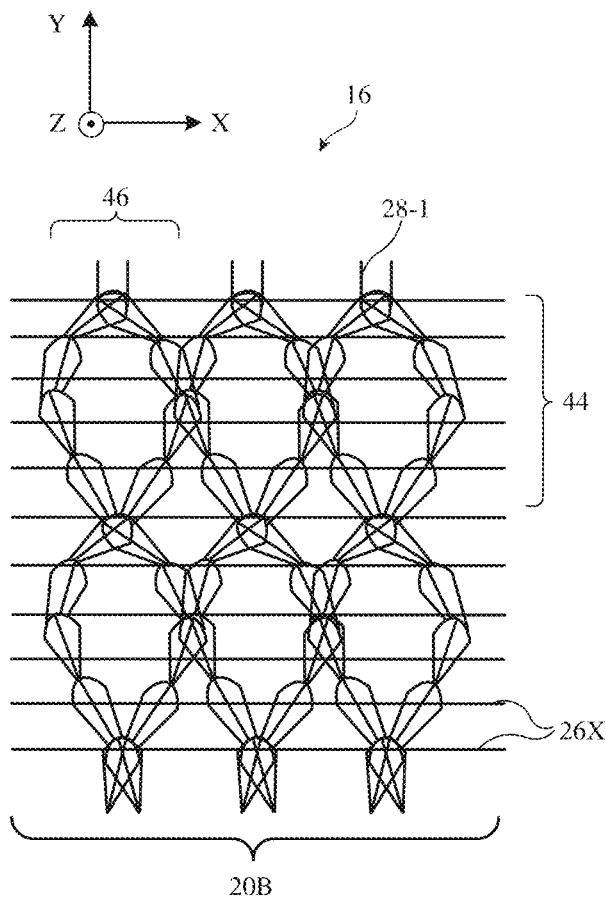
FIG. 11 is a diagram of a portion of an illustrative cover having a hinge region in a bent state in accordance with an embodiment.

When front cover 16F is in a flat state where panel 22' is coplanar with adjacent panel 22, inlay yarn 26X may have a slightly wavy shape, as shown in FIG. 10. When panel 22' is bent (e.g., in direction 50 and/or 52 of FIG. 8), inlay yarn 26X may come under tension and may transition to a straight shape, as shown in FIG. 11. One of the ways to adjust the angle at which the movement of panel 22' becomes restricted (e.g., angle θ1 and/or angle θ2 of FIG. 8) is to change the path of strand 26X in fabric 28. For example, inlay strand 26X may span across every course 44, every other course 44, every two courses 44, etc., depending on the desired range of motion of panel 22' about axis 24B.

The foregoing is merely illustrative and various modifications can be made by those skilled in the art without departing from the scope and spirit of the described embodiments. The foregoing embodiments may be implemented individually or in any combination.

What is claimed is:

1. A cover for an electronic device, comprising:
a front cover portion, a rear cover portion, and a spine region between the front and rear cover portions, wherein the front cover portion is configured to rotate relative to the rear cover portion about an axis that extends along the spine region;
first and second warp knit fabric layers that span across the front cover portion, the rear cover portion, and the spine region; and
a spacer strand coupled between the first and second warp knit fabric layers in the spine region.

2. The cover defined in claim 1 wherein the front cover portion comprises first and second panels that rotate relative to one another about an additional axis that is parallel to the axis.

3. The cover defined in claim 2 wherein the front cover portion has a flexible hinge region between the first and second panels and wherein the additional axis extends along the flexible hinge region.

4. The cover defined in claim 3 wherein the flexible hinge region comprises an additional spacer strand coupled between the first and second warp knit fabric layers.

5. The cover defined in claim 4 further comprising a stiffener in the front cover portion.

6. The cover defined in claim 5 wherein the stiffener is located in the second panel between the spacer strand and the additional spacer strand.

7. The cover defined in claim 5 wherein the stiffener is interposed between the first and second warp knit fabric layers.

8. The cover defined in claim 7 further comprising an additional stiffener located in the first panel.

9. The cover defined in claim 3 further comprising an inlay strand in the first warp knit fabric layer in the flexible hinge region that restricts a range of motion of the first panel relative to the second panel.

10. The cover defined in claim 1 further comprising an additional spacer strand in the front cover portion, wherein the additional spacer strand is coupled between the first and second warp knit fabric layers and has a different melting temperature than the spacer strand.

11. A cover for an electronic device, comprising:
first and second cover portions, wherein the first cover portion is configured to rotate relative to the second cover portion;
a hinge region coupled between the first and second cover portions, wherein the hinge region comprises spacer fabric; and
an inlay strand that extends along the hinge region and that restricts motion of the first cover portion relative to the second cover portion.

12. The cover defined in claim 11 wherein the spacer fabric comprises first and second warp knit fabric layers and a spacer strand coupled between the first and second warp knit fabric layers.

13. The cover defined in claim 11 further comprising a rear cover portion and an additional hinge region, wherein the additional hinge region is coupled between the second cover portion and the rear cover portion.

14. The cover defined in claim 13 wherein the additional hinge region comprises additional spacer fabric.

15. The cover defined in claim 14 further comprising a stiffener in the second cover portion between the spacer fabric and the additional spacer fabric.

16. A fabric cover for an electronic device, comprising:
a front cover portion having first and second panels;
a rear cover portion;
a first hinge between the front cover portion and the rear cover portion; and
a second hinge between the first and second panels, wherein the first and second hinges comprise spacer fabric.

17. The fabric cover defined in claim 16 further comprising an inlay strand in the second hinge that restricts motion of the first panel relative to the second panel.

18. The fabric cover defined in claim 16 wherein the spacer fabric comprises first and second warp knit fabric layers and a spacer strand coupled between the first and second warp knit fabric layers.

19. The fabric cover defined in claim 18 wherein the first and second warp knit fabric layers span across the front cover portion and the rear cover portion.

20. The fabric cover defined in claim 16 further comprising a first stiffener in the first panel, a second stiffener in the second panel, and a third stiffener in the rear cover portion.

* * * * *